United States Patent
Konno et al.

[11] Patent Number: 5,805,378
[45] Date of Patent: Sep. 8, 1998

[54] MAGNETIC DISK DRIVE OF A STRUCTURE CAPABLE OF BEING LIGHTENED IN WEIGHT

[75] Inventors: Makoto Konno; Hisashi Shibata; Hisateru Komatsu; Makoto Takahashi; Akira Shibata; Yoshihito Otomo; Koichi Seno; Takashi Watanabe, all of Tendo, Japan

[73] Assignee: Mitsumi Electric Co., Ltd., Tokyo, Japan

[21] Appl. No.: 719,797

[22] Filed: Sep. 25, 1996

[30] Foreign Application Priority Data

Sep. 26, 1995 [JP] Japan .................................. 7-247882
Sep. 26, 1995 [JP] Japan .................................. 7-248055

[51] Int. Cl.⁶ ............................ G11B 33/00; G11B 17/04
[52] U.S. Cl. ............................ 360/97.01; 360/99.06; 369/75.1
[58] Field of Search ........................ 360/97.01, 99.01, 360/99.02, 99.03, 99.06, 99.07; 369/75.1, 75.2, 77.1, 77.2

[56] References Cited

U.S. PATENT DOCUMENTS

| | | | |
|---|---|---|---|
| 5,060,101 | 10/1991 | Isomura | 360/99.06 |
| 5,062,099 | 10/1991 | Odawara et al. | 369/75.2 |
| 5,400,198 | 3/1995 | Suzuki et al. | 360/99.06 |
| 5,469,421 | 11/1995 | Aruga et al. | 369/75.1 |
| 5,633,768 | 5/1997 | Watanabe | 369/75.1 |
| 5,633,849 | 5/1997 | Konno et al. | 369/75.1 |
| 5,657,184 | 8/1997 | Sawada et al. | 360/99.06 |
| 5,677,897 | 10/1997 | Anada et al. | 369/77.2 |
| 5,684,776 | 11/1997 | Davis et al. | 369/75.2 |

*Primary Examiner*—Stuart S. Levy
*Assistant Examiner*—David L. Ometz
*Attorney, Agent, or Firm*—Frishauf, Holtz, Goodman, Langer & Chick

[57] ABSTRACT

A sub-printed board 40 is disposed on a main plate of a main frame 30 at a position close to a front bezel 37. A main printed board 31 is provided on the main plate at a position opposite to the front bezel. A rotation drive mechanism for magnetic disks is mounted on the sub-printed board. A loading mechanism is assembled over the rotation drive mechanism in order to mount and eject the magnetic disks on and out of the magnetic disk drive. A head carriage 34 is disposed above the main printed board by means of a first supporting member provided on the main plate.

20 Claims, 8 Drawing Sheets

MAGNETIC DISK DRIVE OF A STRUCTURE CAPABLE OF BEING LIGHTENED IN WEIGHT

BACKGROUND OF THE INVENTION

The present invention relates to a magnetic disk. drive on which magnetic disks such as flexible magnetic disks can be mounted for the purpose of writing and reading data.

Magnetic disk drives typically comprise a head carriage for use in holding in a movable manner a magnetic head that writes and reads data on and from a magnetic disk; a carrier mechanism for carrying the head carriage in a predetermined radial direction relative to the magnetic disk; a disk table on which the magnetic disk is held and rotationally driven; a rotation drive mechanism for driving the disk table; a loading mechanism that loads the magnetic disk inserted through a magnetic disk slot on the disk table and unloads the magnetic disk on the disk table through the magnetic disk slot; a main printed board on which circuit components are mounted; a sub-printed board on which the rotation drive mechanism and the disk table are mounted; and a main frame to which the main printed board and the sub-printed board are attached.

Conventional magnetic disk drives have mechanical mechanisms required for writing and reading data in addition to the sub-printed board on an upper surface side of the main frame. The main printed board is positioned on a lower surface side of the main frame. Therefore, it is necessary to turn the main frame upside down to assemble the components during manufacturing to provide a disk drive product, which causes some problems during the manufacturing operation. In addition, it is necessary to use two covers, i.e., upper and lower covers to contain and cover the above mentioned mechanical mechanisms and the electrical circuit components on the main printed board.

Typical main frames are made by means of diecasting an aluminum material, taking their mechanical strength into consideration. Recently, however, the aluminum main frames have been replaced by main frames manufactured by pressing an iron plate. The iron plates used for the main frames typically having a thickness of at least 1 mm in order to provide necessary mechanical strength. There are thus limitations to the possible reduction in material costs and weight of the magnetic disk drive.

SUMMARY OF THE INVENTION

With respect to the above mentioned problems, a primary object of the present invention is to provide a magnetic disk drive having such a structure that all mechanisms and electrical circuit components required for the writing and reading of data are contained in a main frame.

Another object of the present invention is to provide a magnetic disk drive in which a plate for the main frame is reduced in thickness while suppressing as much as possible a decrease of the mechanical strength which may be caused as a result of the reduction in thickness.

Other objects of the present invention will become more apparent upon a reading of following description.

A magnetic disk drive according to the present Invention comprises a head carriage for use in holding in a movable manner a magnetic head that writes and reads data on and from a magnetic disk; a carrier mechanism for carrying the head carriage in a predetermined radial direction relative to the magnetic disks a disk table on which the magnetic disk is held and rotationally driven; a rotation drive mechanism for driving the disk table; a loading mechanism that loads the magnetic disk inserted through a magnetic disk slot on the disk table and unloads the magnetic disk on the disk table through the magnetic disk slot; a main printed board on which circuit components are mounted; a sub-printed board on which the rotation drive mechanism and the disk table are mounted; and a main frame having a main plate and side plates on both sides of the main plate in which the above mentioned components are assembled.

According to an aspect of the present invention, the sub-printed board is placed on the main plate of the main frame at a position close to the slot. The main printed board is placed on the bottom of the main plate at a position opposite to the slot. The loading mechanism is assembled over the sub-printed board. The head carriage is disposed on a first supporting member provided on the main plate at an upper portion than the main printed board.

DESCRIPTION OF THE PREFERRED EMBODIMENT

Figure 1:
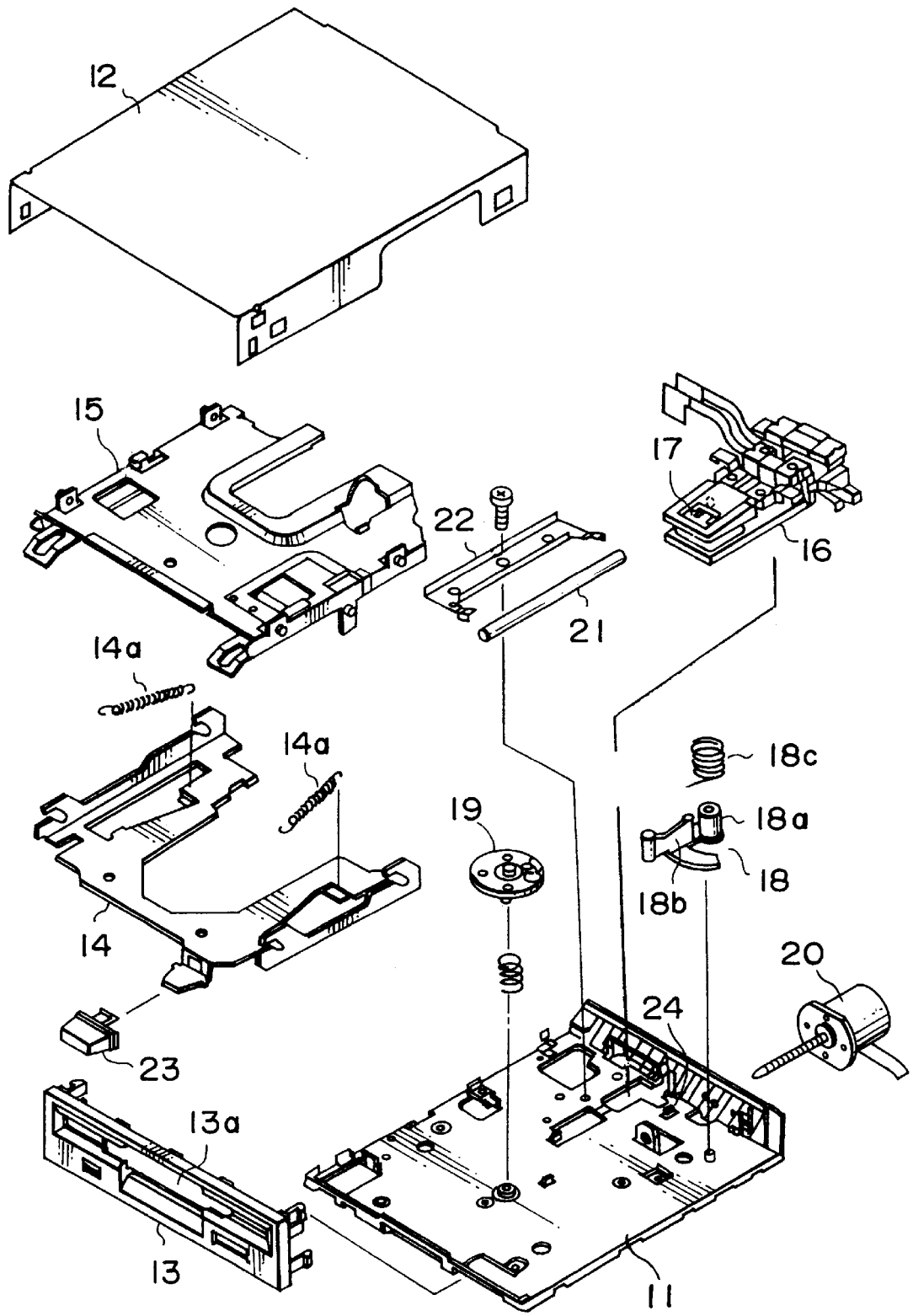
FIG. 1 is an exploded perspective view schematically illustrating the inside a conventional magnetic disk drive.

Referring to FIG. 1, an example of a conventional magnetic disk drive will now be described. This magnetic disk drive comprises a main frame 11 and a cover 12 made of a thin metal plate to cover the main frame 11. A combination of the main frame 11 and the cover 12 forms a hollow receiving space to receive a magnetic disk (not shown). The magnetic disk has an access region which data are written into and read out of when placed in the receiving space.

A front bezel 13 is assembled in front of the receiving space to guide the magnetic disk into the receiving space in a correct attitude. The front bezel 13 has a slot 13a formed therein. An ejection plate 14 and a disk holder unit 15 to be opposed to the upper surface of the magnetic disk are provided in the receiving space, to position the magnetic disk inserted therein through the slot 13a such that the lower surface of the magnetic disk faces to the ejection plate and to hold the magnetic disk at a predetermined position, respectively.

A head carriage 16 and an ejection lever 18 are also provided in the receiving space. The head carriage 16 comprises a magnetic head 17 to be opposed to a window of the magnetic disk when the magnetic disk is located at a predetermined position. The ejection lever 18 has a rotation shaft 18a pivotally mounted to the main frame 11 and an arm unit 18b extending in one direction from the rotation shaft 18a. The ejection lever 18 is biased by an ejection lever spring 18c and is rotatable on the rotation shaft 18a horizontally with respect to the surface of the main frame 11.

As the components held on the main frame 11, provided thereon along with the ejection lever 18 and the head carriage 16 are a disk table 19 on which magnetic disks are rotated, a stepping motor 20 for use in moving the head carriage 16 back and forth, a guide bar 21 for guiding the head carriage 16, and a guide bar clamp 22 for clamping the guide bar 21. Attached with screws to the lower surface of the main frame 11 as the components of the magnetic disk drive are a main printed board on which circuits required for the storage and retrieval of the data are mounted, a motor for use in rotation driving the disk table 19, and a sub-printed board on which a driving circuit for the motor Is mounted, which are all not shown in the figure. The main printed board and the sub-printed board are covered with a lower cover (not shown).

The ejection plate 14 moves slightly backward to rotate the ejection lever 18 when an ejection button 23 projected outside the front bezel 13 is depressed into the receiving space.

The magnetic disk hold within the receiving space in locked by means of a locking mechanism (which is not shown) in order to prevent the magnetic disk from escaping from the receiving space. By releasing the lock of the locking mechanism with the magnetic disk being locked within the receiving space, the ejection lever 18 rotates because of the spring force of the ejection lever spring 18c to push the magnetic disk. As a result, a part of the magnetic disk is ejected out of the receiving space through the slot 13a formed in the front bezel 13. The ejection plate 14 is provided with an ejection spring 14a as a spring mechanism. The ejection spring 14a returns the ejection plate 14 to its original position when the depression of the ejection button 23 is released. In this way the magnetic disk can be taken out of the receiving space.

As apparent from the above description, in the conventional magnetic disk drive, the mechanical mechanisms required for the storage and retrieval of the data are provided on the upper surface side of the main frame 11 and the electrical circuit components formed of a printed wiring board are provided on the lower surface side. Therefore, it is necessary to turn the main frame 11 upside down to assemble the components during manufacturing to provide a disk drive product, which causes some problems during the manufacturing operation. In addition, it is necessary to use two covers, i.e., upper and lower covers to contain and cover the above mentioned mechanical. mechanisms and the electrical circuit components on the main printed board.

Furthermore, the main frame 11 is made by means of die-casting an aluminum material, taking their mechanical strength into consideration. The aluminum main frames have been, however, replaced by those manufactured by pressing an iron plate that have been a mainstream in recent years. The iron plates used for the main frames are those having a thickness of at least 1 mm in order to provide a necessary mechanical strength. There are thus limitations to the possible reduction in material costs and weight of the magnetic disk drive.

The head carriage 16 cooperates with a zero-zero sensor 24 used for positioning the same. The zero-zero sensor 24 is placed at a position corresponding to the rear end of the head carriage 16 positioned at the backward limit of movement of the zero-zero sensor 24 Such a zero-zero sensor is disclosed in Japanese Unexamined Utility Model Publication No. 126360/1992.

Figure 2:
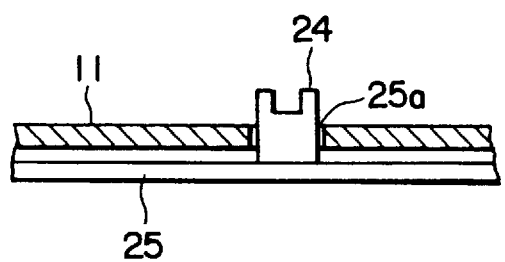
FIG. 2 is a cross sectional view for use in describing a structure of mounting a conventional zero-zero sensor.

As shown in FIG. 2, the zero-zero sensor 24 is mounted on a main printed board 25 arranged on the lower surface side of the main frame 11. For this purpose, the main frame 11 has a hole 25a formed therein to pass the zero-zero sensor 24 therethrough.

The zero-zero sensor 24 should be located positively and precisely at a position corresponding to the rear and of the head carriage 16. This can be achieved by means of connecting a measurement instrument to the zero-zero sensor 24 to position it at the optimum adjustment level. More specifically, the positioning can be made in the following manner. The main frame 11 is provided with the components of the magnetic disk drive shown in FIG. 1, the main printed board 25, and the sub-printed board attached thereto by means of screws. Then, the screws for the main printed board 25 are slightly loosened to move the main printed board 25, thereby to control and adjust the position of the zero-zero sensor 24. During this operation the upper cover plate 12 and the lower cover plate are required to be removed from the magnetic disk drive.

However, the above mentioned adjustment level may be changed when the upper cover plate 12 and the lower cover plate are assembled after the above mentioned positioning. This is because the upper and lower cover plates have a shielding function to the circuit components in the magnetic disk drive. With this respect, the positioning of the zero-zero sensor 24 should be made with the upper and lower covers engaged with the magnetic disk drive, which is impossible for the conventional structure.

Figure 3:
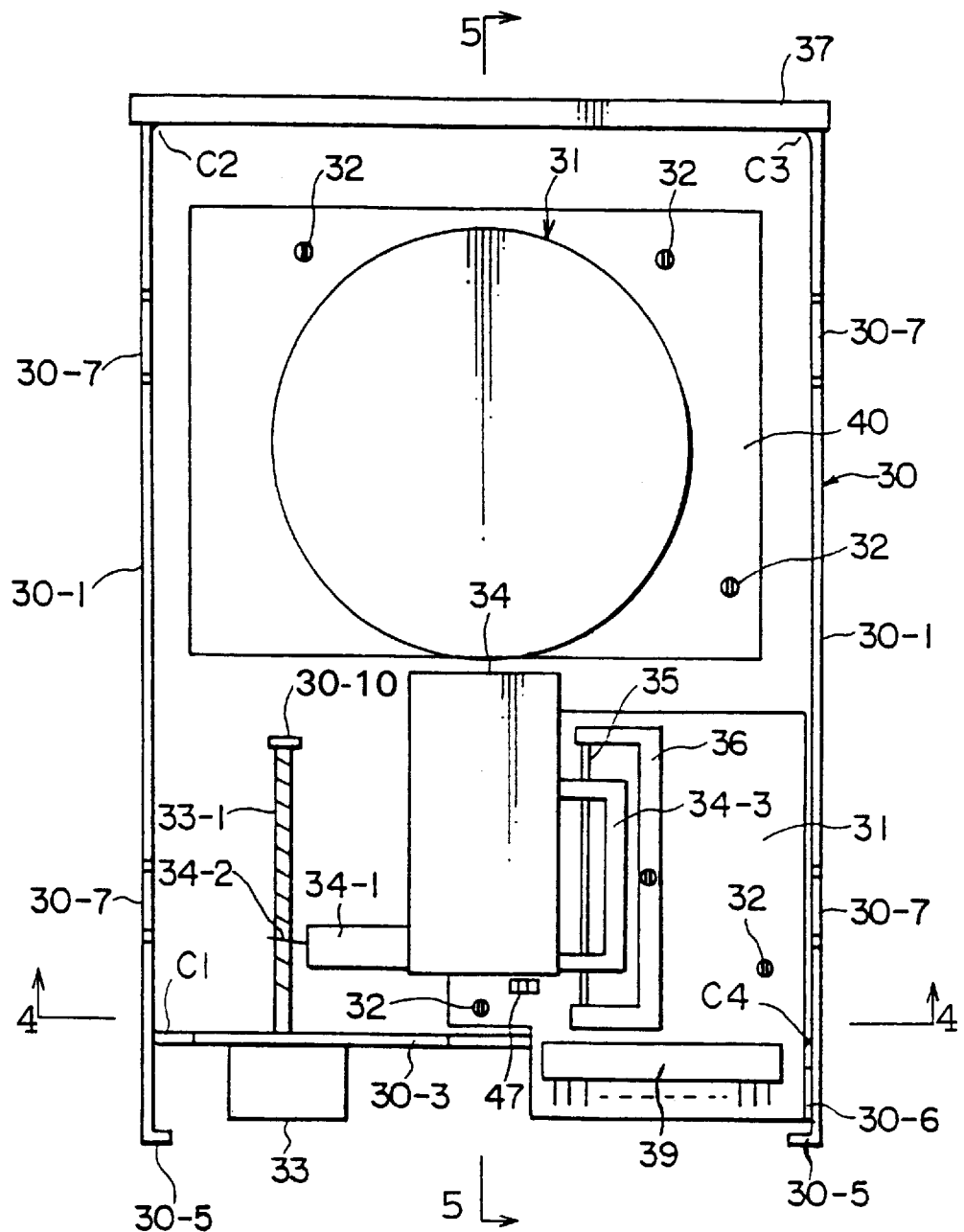
FIG. 3 is a plan view illustrating an inside a magnetic disk drive according to the present invention with a main printed board, a sub-printed board, a head carriage, and their peripheral mechanisms.
Figure 4:
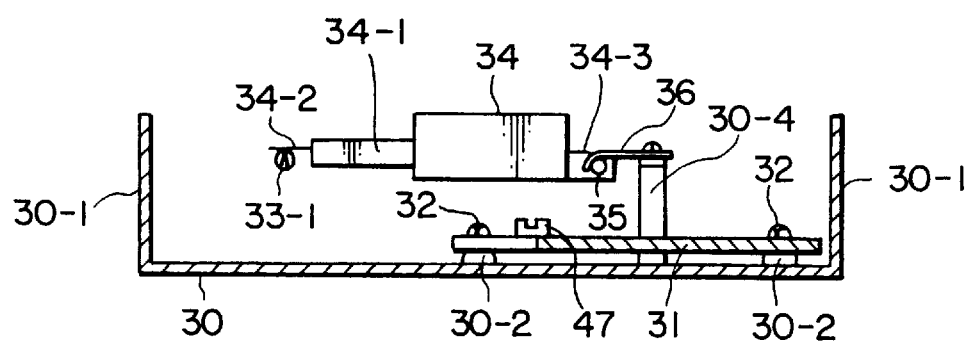
FIG. 4 is a cross sectional view taken on the line 4—4 in FIG. 3.

Referring to FIGS. 3 to 9, a preferred embodiment of the present invention will be described. Of the components of a magnetic disk drive, a loading mechanism for use in loading and unloading magnetic disks on and out of a receiving space is omitted in FIG. 3. A main frame 30 has side plates 30-1 on both sides and is thus U-shaped in cross section. A feature of the present invention is that all components are contained within this main frame 30. As described later, a main printed board 31 and a sub-printed board 40 are fixed with screws to the main frame 30 at a portion closest to the bottom. For the main printed board 31, two supporting bases 30-2 (second supporting members) are formed by cutting and bending of the main frame 30 as shown in FIG. 4, and the main printed board 31 is fixed on these supporting bases 30-2 with screws 32. A reason of using the supporting bases 30-2 is as follows. The main printed board 31 is used to mount electronic parts or circuits on the lower surface thereof, so that it is required to provide a necessary gap between a main plate of the main frame 30 and the main printed board 31.

Referring back to FIG. 3, a stepping motor 33 is provided on a rear plate 30-3 located at the rear end of the main frame 30. An output axis 33-1 of the stepping motor 33 passes through the rear plate 30-3. A tip of the output axis 33-1 is rotatably supported by a bearing unit 30-10 formed by cutting and bending of the main plate of the main frame 30. The output axis 33-1 is threaded in the surface thereof. A pin 34-2 is engaged with the thread In the output axle 33-1 which the pin is buried in an arm 34-1 provided on a head carriage 34. Therefore, the head carriage 34 rotates in the same direction as the. extending direction of the output axis 33-1 in response to the rotation of the latter.

The head carriage 34 is provided with a U-shaped bearing arm 34-3 on the opposite side thereof to the arm 34-1. A guide bar 35 passes though this bearing arm 34-3. The guide bar 35 is hold by a guide bar clamp 36. Therefore, the head carriage 34 is guided by the guide. bar 35 during the movement in response to the rotation of the output axis 33-1. As shown in FIG. 4, the guide bar clamp 36 is fixed to a supporting plate 30-4 (first supporting member) with a screw 36. The supporting plate 30-4 is formed by cutting and bending of the main plate of the main frame 30 and is projected upward through a hole formed in the main printed board 31.

The above mentioned structure allows the head carriage 34 and a carrier mechanism to be arranged for conveyance over the main printed board 31 even when the main printed board 31 is fixed to the bottom at a rear portion of the main frame 30. If the main printed board 31 is not present under the head carriage 34, the space under the head carriage 34 is available for other members, which means flexibility in design is enhanced.

Next, the sub-printed board 40 will be described. As apparent from FIG. 5, the sub-printed board 40 is provided with a motor 41 for use in rotation driving magnetic disks and other necessary circuits (not shown) which are mounted only on the upper surface of the sub-printed board. The sub-printed board 40 is fixed with the screw 32 such that it almost contacts with the main plate of the main frame 30 at a position closer to a slot for the magnetic disk drive, i.e., a front bezel 37 (FIG. 3).

The structure of the motor 41 will be described briefly. The motor 41 comprises a rotation shaft 41-1, a cylindrical center metal 41-2 which serves as a bearing, a core 41-3 for a number of stators radially extending from the center, a stator coil 41-4 wound on the core 41-3 at an end thereof, a ring-shaped permanent magnet 41-5 arranged to surround the periphery of the core 41-3, and a casing 41-6 which holds the permanent magnet in a rotatable manner. In this motor 41, the permanent magnet 41-5 and the casing 41-6 rotate in cooperation with the rotation shaft 41-1.

The casing 41-6 has an upper flat portion 41-6a that has the same function as the disk table 19 described in conjunction with FIG. 1. Therefore, an arm 42 is rotatably attached to the lower surface of the flat portion 41-6a with one end thereof being pivotally supported by the flat portion. The other end of the arm 42 is provided with a drive roller 43 mounted thereon in a rotatable manner. A rectangular hole is formed in the flat portion 41-6a. The drive roller 43 is positioned such that it is projected upward through this rectangular hole. A magnetic disk contained In the receiving space of the magnetic disk drive Is made to lie on the flat portion 41-6a. With this state, the drive roller 43 is inserted into and engaged with a hole formed in a hub of the magnetic disks. In response to the rotation motion of the casing 41-6, the magnetic disk is rotationally driven by the drive roller 43.

Assembled on the upper portion of the motor 41 is a loading mechanism i.e., an ejection plate 44 (corresponding to the reference numeral 14 in FIG. 1) for loading and unloading magnetic disks on and out of the receiving space, a disk holder unit 45, etc. The main frame 30 is combined with a cover plate 38 to cover a space within the main frame 30. The cover plate 38 covers the space from a position on the side of a front bezel 37 to a position corresponding to the rear plate 30-3.

As mentioned above, the main frame 30 contains the main printed board 31, the sub-printed board 40 on which the head carriage 34 and the mechanisms associated with the driving and guiding of the head carriage, the driving mechanism for use in rotationally driving the magnetic disks, and the circuits therefor, are mounted, and the loading mechanism for use in loading and unloading the magnetic disks. Therefore, it is not necessary to provide a cover plate under the main frame 30.

Figure 5:
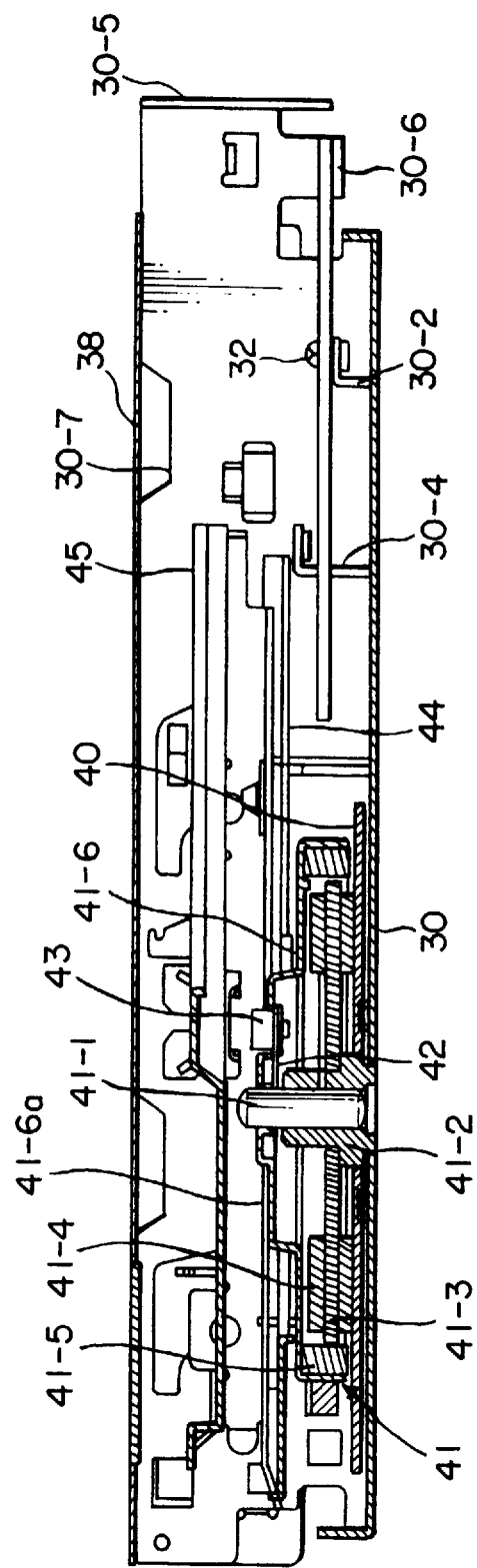
FIG. 5 is a cross sectional view taken on the line 5—5 in FIG. 3.

Referring to FIGS. 3 and 5, the rear portion of the side plate 30-1 is extended more than the rear end portion of the main frame 30. The rearmost edge of the extended portion is bent inside to form a bent portion 30-5. The bent portion 30-5 is formed at a position behind the rear end of the stepping motor 33 and behind pin terminals of an interface connector 39 mounted on a rear portion of the main printed board 31. This is because the following problems would arise because the cover plate 38 would terminate at a position of the rear plate 30-3 if the aide plate 30-1 terminated at a position in front of the bent portion 30-5 and if no bent portion were formed. Name, there would be a possibility during the assembling operation that the stepping motor 33 and the pin terminals of the Interface connector 39 would hit against, for example, a corner of a table and be damaged. The bent portion 30-5 serves as a protective member for the stepping motor 33 and the interface connector 39 to prevent such damage. The front bezel is omitted in FIG. 5.

Furthermore, a portion of the lowermost edge is bent to form a bent portion 30-6 at a rear lower end of the side plate 30-1 adjacent to the main printed board 31. The bent portion 30-6 serves as a supporting member to support a portion of the main printed board 31 that is projected from the rear end of the main frame 30. By forming the supporting member for the main printed board 31 by using the side plate 30-1, one of three screws can be omitted which would otherwise be required conventionally. As a result, the number of the screws is decreased by one.

Figure 6:
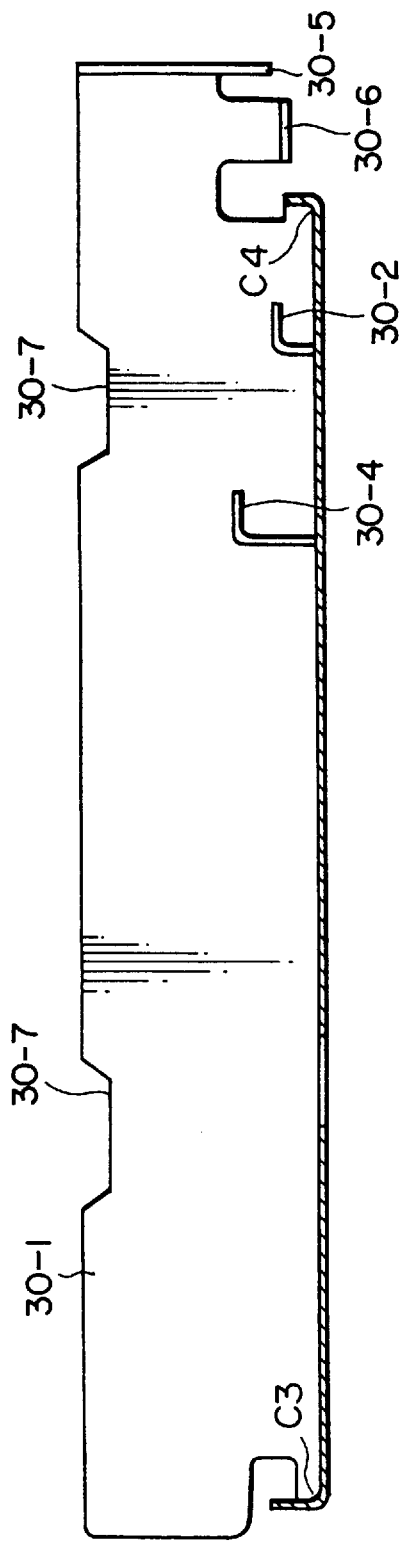
FIG. 6 is a side cross sectional view illustrating a shape of a side plate on the side adjacent to the main printed board, of side plates of the main frame according to the present invention.

In the present invention, the main frame 30 is reduced in thickness from 1 mm to 0.8 mm, taking the reduction of material costs for and the total weight of the main frame 30 into consideration. Therefore, the side plate 30-1 is more likely to be deformed when it receives a load from upward through the cover plate 38. In order to avoid such deformation, a number of notches 30-7 are formed in this embodiment as shown in FIGS. 5 and 6 at the uppermost edge of the side plate 30-1 which are apart from each other along the length of the plate. These notches 30-7 formed in the uppermost edge of the side plate 30-1 allow to distribute a pressure applied from upward through the cover plate 38. Therefore, a possible deformation of the side plate 30-1 can be avoided.

Figure 7:
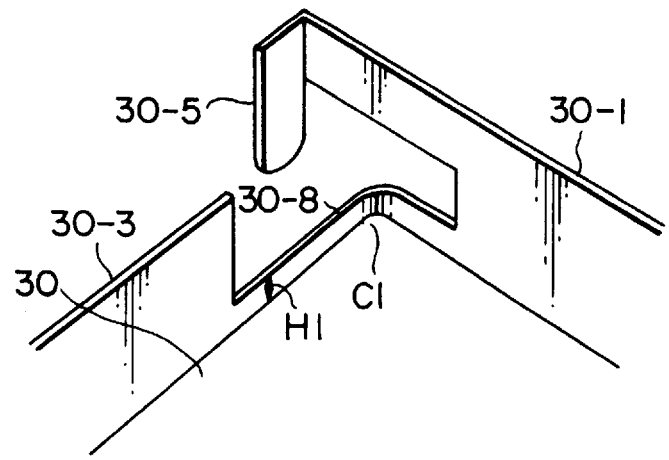
FIG. 7 is a perspective view of a corner portion C1 in FIG. 3 and its periphery, as a perspective from inside.
Figure 8:
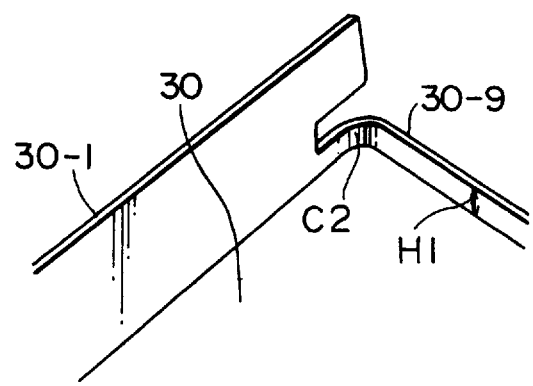
FIG. 8 is a perspective view of a corner portion C2 in FIG. 3 and its periphery, as a perspective from inside.

Furthermore, in the present invention, the following approach is taken in order to improve the mechanical strength of the main frame 30. Projected portions are formed by means of drawing at the edges of the main frame on the slot side and on the opposite side including four corner portions C1 to C4 of the main frame 30 illustrated in FIG. 3. FIG. 7 shows the corner portion C1 in FIG. 3 and its periphery. A projected portion 30-8 having a height of H1 is provided at the corner portion C1 in order to avoid generation of a slit. FIG. 8 shows the corner portion C2 in FIG. 3 and its periphery. A projected portion 30-9 having the height H1 is provided at the frontmost edge of the main frame 30 including the corner portion C2 in order to avoid generation of a slit at the corner portion C2.

Figure 9:
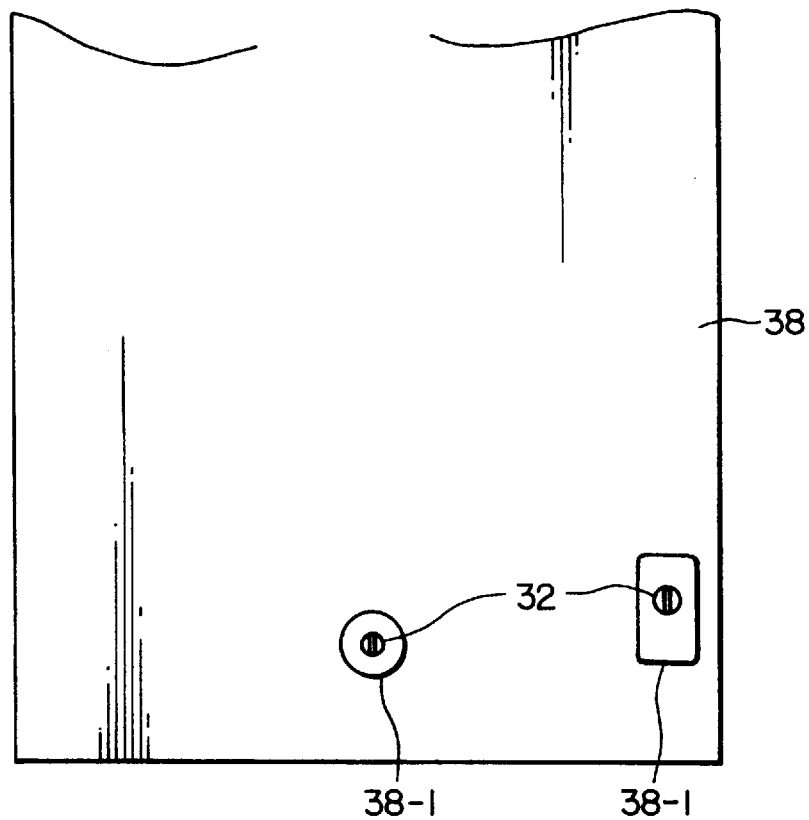
FIG. 9 is a partial plan view of an upper cover plate shown in FIG. 5.

Next, referring to FIGS. 3, 4, and 9, the mounting structure of a zero-zero sensor will now be described. In the present invention, the zero-zero sensor 47 is positioned on the main printed board 31. In FIG. 9, the upper cover plate 38 to be engaged with the main frame 30 is provide with two holes 38-1 formed therein at the positions corresponding to where two screws 32 are to be threaded. The holes 38-1 each has a size enough to allow threading of the screw 32 with a tool such as a screw driver. The holes 38-1 may be any shape such as a circle or rectangle.

In the present invention, the positioning of the zero-zero sensor 47 is carried out after the cover plate 38 is assembled to the main frame 30. More specifically, the screws 32 are slightly loosen by using, for example, a screw driver through the holes 38-1 in the cover plate 38. The main printed board 31 is moved bit by bit to achieve the optimum adjustment level of the zero-zero sensor 47 measured by a measurement instrument. The screws 32 are tightened when the optimum adjustment level is achieved to fix the position of the main printed board 31, thereby the position of the zero-zero sensor 47 is determined. The positioning of the main printed board 31 can be made by using a part of the main printed board 31 that is projected out from the main frame 30.

As apparent from the above description, the main printed board 31 is arranged within the main frame 30 and the zero-zero sensor 47 is positioned with the cover plate 38 remained as a semi-completed product after all steps of the assembling process. After this adjustment, the hole 20-1 may be closed with a seal or a sticker.

As described above, the magnetic disk drive according to the present invention, following effects and advantages are obtained.

A. The components can be assembled one by one from the bottom of the main frame without a process of turning the main frame upside down, so that the assembling process can be simplified.

B. The main printed board and the sub-printed board are contained within the main frame, so that no lower cover plate is required, which otherwise is necessary for the conventional magnetic disk drives.

C. The conventional magnetic disk drives in which the main printed board is attached to the lower surface of the main frame has a limitation of height of an IC package mounted on the main printed board to 3.1 mm or smaller In order to ensure the height of the magnetic disk drive of ½ inches (called as a half height size). On the contrary, the present invention can ensure an enough clearance between the main printed board and the main plate of the main frame even in the magnetic disk drive of the half height size, so that there is no limitation of 3.1 mm or smaller in height of the IC package to be mounted on the main printed board.

D. The rear portion of the main frame can be used to provide, without any other separate members, a protective structure to avoid damages due to an external force against the stepping motor and the interface connector.

E. Reduction in thickness of the plate for the main frame from conventional 1.0 mm to 0.8 mm allows reduction or the material costs for and the total weight of the main frame. The deformation of the said plates due to the external force, which may be caused as a result of the reduction in thickness, can be avoided by means of providing the notches in the side plates. In addition, the mechanical strength of the entire main frame can be improved with the projected portions formed by means of drawing at the edges of the magnetic disk on the slot side and on the opposite side including four corner portions of the main frame.

F. The main printed board is arranged within the main frame and the zero-zero sensor is mounted on the main printed board, so that the positioning of the zero-zero sensor can be made without removing the cover.

What is claimed is:

1. A magnetic disk drive comprising:
    a head carriage for use in holding a magnetic head in a movable manner, said magnetic head being capable of writing data on and reading data from a magnetic disk;
    a carrier mechanism for carrying the head carriage in a predetermined radial direction relative to the magnetic disk;
    a disk table on which the magnetic disk is held and rotationally driven;
    a rotation drive mechanism for driving the disk table;
    a loading mechanism for loading the magnetic disk inserted through a magnetic disk slot on the disk table and for unloading the magnetic disk on the disk table through the magnetic disk slot;
    a main printed board having circuit components mounted thereon;
    a sub-printed board on which the rotation drive mechanism and the disk table are mounted; and
    a main frame having a main plate and a side plate on both sides of the main plate;
    wherein:
        said sub-printed board is provided on the main plate of the main frame at a position close to the magnetic disk slot;
        said main printed board is provided on the bottom of the main plate at a position opposite to the magnetic disk slot;
        said loading mechanism is assembled over the sub-printed board;
        said head carriage is disposed on a first supporting member provided on the main plate at a position above the main printed board;
        said first supporting member comprises a cut and bent portion of the main plate projected upward through a hole formed in the main printed board; and
        said carrier mechanism comprises a guide bar, supported by the first supporting member, for guiding the head carriage in the predetermined radial direction.

2. The magnetic disk drive according to claim 1, wherein said main frame is formed of an iron plate having a thickness of 0.8 mm.

3. The magnetic disk drive according to claim 2, wherein a rear portion of one of the side plates is extended in a direction away from an end of the main plate, and an edge of the extended rear portion is bent inward to form a bent portion.

4. The magnetic disk drive according to claim 2, wherein at least one notch is formed in an uppermost edge of at least one of the side plates.

5. The magnetic disk drive according to claim 2, wherein projected portions are formed at corners of the main frame by means of drawing at edges of the main frame.

6. The magnetic disk drive according to claim 2,
    wherein said magnetic disk drive further comprises a sensor for use in positioning the head carriage mounted on the main printed board, and a cover plate for engaging the main frame to cover an upper portion of a magnetic disk drive body;
    wherein said sensor is placed at a position corresponding to a rear end of said head carriage when said head carriage is at a predetermined stop position; and wherein at least one hole is formed in said cover plate at a position corresponding to where a screw is threaded in the main printed board to fix the main printed board on the main plate.

7. The magnetic disk drive according to claim 1, wherein said main printed board is arranged on a second supporting member provided on the main plate and has a downward facing component-mounting surface, said second supporting member having a height smaller than that of the first supporting member to ensure that a predetermined space is formed between the component-mounting surface and the main plate.

8. The magnetic disk drive according to claim 7, wherein a rear portion of one of the side plates is extended in a direction away from an end of the main plate, and an edge of the extended rear portion is bent inward to form a bent portion.

9. The magnetic disk drive according to claim 7, wherein at least one notch is formed in an uppermost edge of at least one of the side plates.

10. The magnetic disk drive according to claim 7, wherein projected portions are formed at corners of the main frame by means of drawing at edges of the main frame.

11. The magnetic disk drive according to claim 7, wherein said magnetic disk drive further comprises a sensor for use in positioning the head carriage mounted on the main printed board, and a cover plate for engaging the main frame to cover an upper portion of a magnetic disk drive body;

wherein said sensor is placed at a position corresponding to a rear end of said head carriage when said head carriage is at a predetermined stop position; and wherein at least one hole is formed in said cover plate at a position corresponding to where a screw is threaded in the main printed board to fix the main printed board on the main plate.

12. The magnetic disk drive according to claim 1, wherein a rear portion of one of the side plates is extended in a direction away from an end of the main plate, and an edge of the extended rear portion is bent inward to form a bent portion.

13. The magnetic disk drive according to claim 12, wherein at least one notch is formed in an uppermost edge of at least one of the side plates.

14. The magnetic disk drive according to claim 12, wherein projected portions are formed at corners of the main frame by means of drawing at edges of the main frame.

15. The magnetic disk drive according to claim 1, wherein at least one notch is formed in an uppermost edge of at least one of the side plates.

16. The magnetic disk drive according to claim 15, wherein projected portions are formed at corners of the main frame by means of drawing at edges of the main frame.

17. The magnetic disk drive according to claim 15, wherein said magnetic disk drive further comprises a sensor for use in positioning the head carriage mounted on the main printed board, and a cover plate for engaging the main frame to cover an upper portion of a magnetic disk drive body;

wherein said sensor is placed at a position corresponding to a rear end of said head carriage when said head carriage is at a predetermined stop position; and wherein at least one hole is formed in said cover plate at a position corresponding to where a screw is threaded in the main printed board to fix the main printed board on the main plate.

18. The magnetic disk drive according to claim 1, wherein projected portions are formed at corners of the main frame by means of drawing at edges of the main frame.

19. The magnetic disk drive according to claim 18, wherein said magnetic disk drive further comprises a sensor for use in positioning the head carriage mounted on the main printed board, and a cover plate for engaging the main frame to cover an upper portion of a magnetic disk drive body;

wherein said sensor is placed at apposition corresponding to a rear end of said head carriage when said head carriage is at a predetermined stop position; and wherein at least one hole is formed in said cover plate at a position corresponding to where a screw is threaded in the main printed board to fix the main printed board on the main plate.

20. The magnetic disk drive according to claim 1, wherein said magnetic disk drive further comprises a sensor for use in positioning the head carriage mounted on the main printed board, and a cover plate for engaging the main frame to cover an upper portion of a magnetic disk drive body;

wherein said sensor is placed at a position corresponding to a rear end of said head carriage when said head carriage is at a predetermined stop position; and wherein at least one hole is formed in said cover plate at a position corresponding to where a screw is threaded in the main printed board to fix the main printed board on the main plate.

* * * * *